United States Patent
Ritter

(10) Patent No.: US 6,477,982 B1
(45) Date of Patent: Nov. 12, 2002

(54) SUBSTANCES AND METHOD FOR THE PRODUCTION OF WATER SUITABLE FOR AQUARIUMS OR GARDEN PONDS

(75) Inventor: Günter Ritter, Bünde (DE)

(73) Assignee: Warner-Lambert Company, Morris Plains, NJ (US)

( * ) Notice: Subject to any disclaimer, the term of this patent is extended or adjusted under 35 U.S.C. 154(b) by 0 days.

(21) Appl. No.: 09/142,358

(22) PCT Filed: Feb. 27, 1997

(86) PCT No.: PCT/EP97/00950

§ 371 (c)(1),
(2), (4) Date: May 24, 1999

(87) PCT Pub. No.: WO97/34838

PCT Pub. Date: Sep. 25, 1997

(51) Int. Cl.[7] .................................................. A01K 63/04
(52) U.S. Cl. ........................................ 119/231; 119/268
(58) Field of Search ................................. 119/231, 268, 119/243, 260

(56) References Cited

U.S. PATENT DOCUMENTS

| | | | | | |
|---|---|---|---|---|---|
| 3,585,967 A | * | 6/1971 | Kelley et al. | ................... | 119/3 |
| 3,623,455 A | * | 11/1971 | Kelley et al. | ................... | 119/3 |
| 3,886,904 A | * | 6/1975 | King | .............................. | 119/3 |
| 4,110,467 A | * | 8/1978 | Sano et al. | .................. | 424/280 |
| 4,664,065 A | * | 5/1987 | Schneider | ....................... | 119/3 |
| 4,962,728 A | * | 10/1990 | Highfill | ........................... | 119/3 |
| 5,485,808 A | * | 1/1996 | Huebner | ..................... | 119/231 |

* cited by examiner

*Primary Examiner*—Charles T. Jordan
*Assistant Examiner*—Aileen J. Baker
(74) *Attorney, Agent, or Firm*—Darryl C. Little; Evan J. Federman

(57) ABSTRACT

The present invention is concerned with agents and processes for the production of biologically advantageous to almost natural maintenance water, especially for aquaria and garden pond water and also from biologically unfavorable to harmful starting water.

5 Claims, No Drawings

SUBSTANCES AND METHOD FOR THE PRODUCTION OF WATER SUITABLE FOR AQUARIUMS OR GARDEN PONDS

DESCRIPTION

The present invention is concerned with agents and processes for the production of biologically advantageous to almost natural maintenance water, especially for aquaria and garden pond water, also from biologically unfavourable to harmful starting water.

In aquaria or in the maintenance of aquatic animals, for about 30 years it has become established practice partly or completely to exchange the maintenance water regularly by fresh water and thereby to reduce the loading of the maintenance water in relation to the water exchange rate.

Of the possible sources of fresh water, for example spring water, rainwater and tap water, tap water or drinking water has by far achieved the greatest importance because of its outstanding purity.

However, in the case of the use of tap or drinking water as fresh water for aquaria, problems arise since tap or drinking water is specially prepared, having regard to its use as nutriment for humans, in the local waterworks. Because of these special properties controlled by the drinking water regulations, drinking water differs considerably from natural, bioactive waters in the following aspects:

it is almost germ-free;

it contains no or only negligible amounts of organic materials;

it contains non-complexed heavy metals which are admittedly completely harmless for humans but which can be highly toxic for water organisms;

it is frequently mixed with disinfecting, degerminating compounds, for example chlorine or other active chlorine compounds, in order to ensure the hygienic character of the drinking water up to the final user;

the Ca:Mg ratio is often far too high and magnesium ions are often completely absent;

in inland regions, the iodine content is extremely low;

the redox character is in the strongly oxidising region, already brought about by the presence of chlorine and active chlorine compounds;

because of the above-described properties and especially because of the absence of organic compounds, it acts very aggressively on the sensitive mucous membranes of fish and other water organisms.

From all of the described properties of tap or drinking water, it follows that, because of its purity, it admittedly appears to be very suitable to improve loaded maintenance water by water exchange but this initially very positive aspect is nullified by the series of above-mentioned negative factors or is even reversed.

From DE 22 21 545, it is known to minimise or solve important aquarial problems of tap or drinking water by means of functional synthetic additives.

The problem of chlorine or active chlorine compounds can be solved by means of reduction by sodium thiosulphate.

Heavy metals can be removed by complexing with synthetic complex formers, for example ethylenediaminetetraacetic acid (EDTA).

The aggressive behaviour of tap water can be ameliorated by the addition of polyvinylpyrrolidones.

The addition of vitamin $B_1$ has proved to be useful as an anti-stress component.

The acute negative aspects of tap or drinking water are admittedly dealt with, ameliorated or eliminated by these suggested agents but these measures introduce new and unnatural materials into the almost natural maintenance system, the effects of which on biological processes are not precisely known.

The biological decomposability of these synthetic compounds is also, as a rule, retarded or does not take place because of their xenobiotic (biologically foreign) nature.

It is known of EDTA and analogous compounds and of polyvinylpyrrolidones that they are not broken down at all or only very slowly. In the case of the use of thiosulphate as anti-chlorine reagent, depending upon the stoichiometry, there result further polysulphane-polysulphonic acids, for example tetrathionate, $S_4O_6^{2-}$, and other reaction products, the biological action of which is also not known. Thiosulphate and its complex subsequent products are biologically foreign and potentially harmful substances.

Summarising, it can be stated that the solutions to the problems described in DE 22 21 545 admittedly function satisfactorily from the chemical point of view but the biological effects thereof on the small ecosystems of aquaria and other maintenance systems is not known and, therefore, initially are to be regarded as being at most neutral.

With the present invention, it is achieved that all the above-described problems which arise in the case of the use of tap or drinking water for the exchange of water in biological maintenance systems are reduced or overcome without it resulting in the introduction of biologically or ecologically foreign materials into the maintenance systems, for example aquaria.

Surprisingly, all problems in the case of fresh tap or drinking water can be solved by not using the above-described synthetic compounds but rather exclusively materials or compounds which occur naturally or are produced in natural systems of organisms (vegetable and animal organisms and micro-organisms).

These materials are, in part, present as metabolic products in natural waters in steady state concentrations as the result of biological production and breakdown processes.

If the naturally occurring materials described in the present invention are used in order to eliminate the negative aspects which are involved with the use of fresh tap water, then there are achieved all the desired positive effects of an exchange of water in the case of the addition of fresh tap water to the maintenance system and thus the possibly damaging factors which are involved with an exchange of water are eliminated.

After the chemical reaction of the added natural additives in the fresh water, as unused materials and subsequent products there are only present compounds which can be broken down biologically without problems.

In addition to the reduction of the harmful factors, the added natural compounds themselves or the reaction or breakdown products thereof manifest further positive effects in the ecosystem, for example the aquarium.

The variant of the working up of biologically-ecologically unfavourable tap or drinking water, here presented as the solution according to the present invention, is novel and, in the totality of the positive actions, is also surprising for the expert. For the first time, it is possible to change sterile, aggressive tap or drinking water into almost natural biologically-friendly maintenance water with the use of natural active materials and, parallel thereto, to permit the introduction of further useful factors or to allow these to arise in biological ways.

In the following, the solutions of the problem according to the present invention are described on the basis of fresh water-problem factors for maintenance systems:

Natural reducing agents for chlorine and other active chlorine compounds:

For this purpose, all natural materials can be used which themselves are non-toxic and can be broken down biologically and manifest a reducing action with regard to chlorine and other active chlorine compounds, for example chloramine, chlorine dioxide and the like. Examples herefor include:

- reducing carboxylic acids and the salts thereof, for example formic acid and oxalic acid;
- natural compounds with aldehyde groups, for example, aldoses, uronic acids, such as erythrose, threose, arabinose, glucose, mannose, galactose, glucuronic acid, mannuronic acid and galacturonic acid;
- compounds which contain thioether and thiohydroxy groups, for example methionine, cysteine, glutathione and D-penicillamine;
- diverse natural reducing agents, for example ascorbic acid, tannic acid and tannins.

The concentrations used depend stoichiometrically on the concentrations of the oxidising agents to be expected (chlorine and active chlorine compounds) and are in the range of from 0.1–100 mg/l and preferably of from 0.5–20 mg/l.

Natural complex formers which can be used for reducing the heavy metal toxicity admittedly mostly do not reach the extremely high complex formation constants of the synthetic complex formers, such as EDTA, DTPA and the like, but nevertheless also lead to a considerable lowering or even elimination of the heavy metal toxicity especially also since, because of their high biocompatibility, they can also be used in large stoichiometric excess. By the formation of 2:1 and 3:1 complexes (with even still higher ratios) (in contradistinction to the 1:1 complexes of the synthetic complex formers), there are also achieved sufficiently high masking effects of the toxic metals and thus an effective detoxification with regard to water organisms.

A further advantage of the natural complex formers is the good biological decomposability of the ligands. During the breakdown, it automatically results in an incorporation and immobilisation of the toxic central metal ions in the decomposing micro-organisms and thereby results in a removal of the toxic metals dissolved in the water.

This is in positive contradistinction to the detoxification with EDTA and analogous compounds, the metal complexes of which are biologically only broken down very slowly and, therefore, are present in the water in dissolved form for a long time.

Examples of natural complex formers include:

- organic carboxylic acids and salts thereof with 2- and multi-toothed ligand properties, for example oxalic acid, tartaric acid, citric acid, mono- and dicarboxylic acids of trioses, tetroses, pentoses, hexoses, for example gluconic acid, mannonic acid, D-sugar acids, mannosugar acids, mucic acid;
- polymers with carboxyl groups, for example alginic acid and alginates, polyglucuronic acid (hemicellulose), gum arabic, ghatti gum, gum tragacanth, pectines and xanthan.

The mol weights of the natural biopolymers lie in the following ranges:

| | |
|---|---|
| alginic acid, alginates | 100,000–500,000 D |
| polyglucuronic acid | 50,000–500,000 D |
| gum arabic | 250,000–1,000,000 D |
| ghatti gum | 100,000–1,000,000 D |
| gum tragacanth | up to 800,000 D |
| pectins | 50,000–180,000 D |
| xanthan | 100,000–1,000,000 D |

Amino acids, for example glycine, alanine, valine, leucine, isoleucine, phenylalanine, tyrosine, proline, hydroxyproline and tryptophane and especially serine, threonine, cysteine, methionine, aspartic acid, glutamic acid, arginine, lysine, histidine and ornithine.

Natural complex formers, for example L-dopa and D-penicillamine

Naturally-occurring phenyl-carboxylic acids, for example hydroxybenzoic acid and hydroxysinnamic acid derivatives, for example gallic acid, gallotannins, chlorogenic acid, caffeic acid and quinic acid.

Natural humic acids and fulvic acids obtained from humus materials in the soil, from peat, from waters, as well as tannic acids and tannins.

Naturally-occurring porphyrin systems or porphyrin coloured materials, for example chlorophylls ($Mg^{2+}$ complexes) which can also be used saponified or demetalised without the central metal.

Bile coloured materials, for example bilirubin.

Natural peptides and proteins, for example glutathione, casein, albumin and lactalbumin.

The concentrations of use of the natural complex formers depend upon the expected and prevailing heavy metal concentrations in the drinking water and are in the range of from 0.1–100 mg/l and preferably of from 1–20 mg/l.

Natural hydro-/biocolloids for reducing the aggressiveness of tap water and for the protection of the mucous membranes of water organisms.

Instead of the synthetic hydrocolloids PVP and cellulose derivative, hydrocolloids which are formed by plants, algae and micro-organisms can also very well be used.

Vegetable hydrocolloids, for example guar gum, gum arabic, ghatti gum, karaya gum, gum tragacanth, carob gum, pectins, dextrins and tamarind gum.

The mol weights of the vegetable hydrocolloids lie in the following ranges:

| | |
|---|---|
| guar gum | 100,000–1,000,000 D |
| gum arabic | 100,000–1,000,000 D |
| ghatti gum | 100,000–1,000,000 D |
| karaya gum | 100,000–1,000,000 D |
| gum tragacanth | 100,000–1,000,000 D |
| carob gum | 100,000–1,000,000 D |
| pectins | 100,000–1,000,000 D |
| tamarind gum | 50,000–120,000 D |
| dextrins | 50,000–500,000 D |

Hydrocolloids produced by algae, for example alginic acid, alginates, carrageenan, furcelleran, agar-agar and Danish agar.

The mol weights of the hydrocolloids produced by algae lie in the following ranges:

| | |
|---|---|
| alginic acid, alginates | 100,000–500,000 D |
| carrageenan | 50,000–500,000 D |
| furcelleran | 50,000–500,000 D |
| agar-agar | 50,000–500,000 D |
| Danish agar | 50,000–500,000 D |

Colloids produced by micro-organisms, for example xanthan gum, scleroglucan, curdlan (succinoglucan) and pullulan.

The mol weights of the biocolloids produced by micro-organisms lie in the following ranges:

| | |
|---|---|
| xanthan gum | 100,000–1,000,000 D |
| scleroglucan | 50,000–500,000 D |
| curdlan (succinoglucan) | 50,000–500,000 D |
| pullulan | 50,000–500,000 D |

The concentrations of use of the biocolloids are from 0.1–100 mg/l and preferably from 1–20 mg/l.

Further usable cell-protecting, bacteria-promoting and ecologically advantageous compounds:

Besides the substances already defined and set out above which, in addition to their functional task role, also promote the bioactive micro-organisms because of their easy biological decomposability, there is a series of natural compounds which have proved to be generally protective, for example against chemical and osmotic level variations.

An addition of such materials to a drinking water conditioning product displays cell- and organism-protecting functions especially in the case of stress caused by the change of water.

The following compounds can be used for these purposes:

carbohydrates, for example the disaccharides saccharose, lactose, maltose, sucrose and trehalose, as well as polysaccharides, for example pectins, hemicellulose, dextrins and xylans.

The mol weights of the biopolymers lie in the following ranges:

| | |
|---|---|
| pectins (hemicelluloses) | 50,000–180,000 D |
| dextrins | 50,000–500,000 D |
| xylans | 50,000–500,000 D |

Monomeric sugars, for example glucose, fructose, mannose, galactose, ribose, arabinose, erythrose and threose;

sugar alcohols, for example glycerol, sorbitol, erythritol, mannitol and inositol;

amino acids as set out above under complex formers;

natural betaines, for example betaine (trimethyl-glycine).

The concentrations of use lie in the range of from 0.1–100 mg/l and preferably of from 5–20 mg/l.

Correction additives for the approximation of the chemical properties of tap and drinking water, spring water and rain water to the conditions of natural waters can also be used in the compositions according to the present invention. There here comes into consideration especially the addition of magnesium salts.

A deficiency of magnesium salts or even the absence thereof in the fresh waters used or the usually prevailing high Ca:Mg ratio can be corrected by the addition of magnesium salts. It is thereby advantageous to use at least in part magnesium salts of the above- described carboxylic acids, amino acids, humic and fulvic acids employed according to the present invention, as well as porphyrin complexes (chlorophylls), in order to minimise the introduction of magnesium salts of more common anions, for example chloride or sulphate.

Therefore, there can be used:

magnesium salts of carboxylic acids, amino acids, humic and fulvic acids used according to the present invention;

magnesium complexes (as chlorophylls);

magnesium chloride or sulphate in the smallest possible amounts.

The concentrations of use in the fresh water should be from 0.5–100 mg/l of magnesium ions and preferably 1–10 mg/l of magnesium ions.

A further correction additive consists in the addition of iodides. The lack of iodine occurring very frequently inland in tap and drinking water can be compensated for by the addition of iodides or iodates, for example sodium iodide, potassium iodide and potassium iodate, to the fresh water.

The concentrations of use in the supplemented fresh water should be from 1 to 100 $\mu$g/l of iodide and preferably from 5 to 20 $\mu$g/l of iodide or from 1.5 to 140 $\mu$g/l of iodate and preferably of from 7 to 28 $\mu$g/l of iodate.

The solutions of the individual problems according to the present invention described above can be used not only individually or combined or also more advantageously in the combination of all individual problem solutions for the natural water preparation of tap and drinking waters.

The substances listed under each individual problem solution are to be used individually or in combination, whereby the sum of the individual substance concentrations, i.e. their total concentration, should, in each case, reach the given concentration limits.

The described individual problem solutions or substance or function groups, as described above, are used for the natural water preparation of tap or drinking water. To the portion of fresh water (of tap or drinking water) is thereby added a final product which introduces the various groups of substances in the given concentrations.

It is also possible to refer the dosaging of the fresh water conditioning product to the total amount of maintenance water (non-changed amount plus exchanged amount of fresh water).

A further method for the obtaining of a biologically active, substantially natural maintenance water is the frequent periodical dosing in, for example daily, every 2 or 3 days or weekly, of the water conditioning agent in correspondingly smaller dosaging. Due to continuous dosing in and rapid biological breakdown, low steady state concentrations of the individual components are achieved.

However, this kind of quasi-continuous dosing in is less suitable for the supplementation of magnesium in which it is a matter of a rapid increasing of the initial concentration.

The above-described combination products can be used in various forms of administration, namely, not only in the form of liquid products, for example aqueous solutions, but also in the form of solid compositions, for example as tablets, powder mixtures, granulates, extrudates, capsules and the like.

The total amount of active substances or the amount of product in the case of a given concentration of active substances determines the product range, i.e. the amount of water to be treated.

In addition to the components according to the present invention, the final products can contain further formulation components known to the expert from the prior art, for example synthetic working-up components, such as are described in DE 22 21 545, buffers, if possible of a natural basis, preserving agents, colouring materials, odour and flavouring materials and/or thickening agents. The following Examples are given for the purpose of illustrating the present invention:

EXAMPLE 1

Product with partial function which, after addition to the maintenance water/fresh water, adjusts the following concentrations of the functional components:

| | |
|---|---|
| tartaric acid | 30 µmol/l |
| formate | 50 µmol/l |
| magnesium ions | 8 mg/l. |

EXAMPLE 2

Product with complete function batch containing all functions according to the present invention which, after addition to the maintenance water/fresh water, adjusts the following concentrations of natural functional components:

| | |
|---|---|
| citric acid | 40 µmol/l |
| glutamic acid | 10 µmol/l |
| formate | 40 µmol/l |
| xanthan | 0.5 mg/l |
| gum arabic | 1.0 mg/l |
| pectin | 0.5 mg/l |
| agar-agar | 1.0 mg/l |
| magnesium ions | 5 mg/l |
| iodide ions | 20 µg/l |
| betaine | 2 mg/l. |

EXAMPLE 3

Product with complete batch of natural functions as described in Example 2 and additionally containing components according to the prior art (DE 22 21 545) for the strengthening of specific functions. In the case of recommended dosaging, the following end concentrations are achieved in the maintenance water/fresh water:

| | |
|---|---|
| ethylenediamine-tetraacetate | 10 µmol/l |
| citric acid | 40 µmol/l |
| glutamic acid | 20 µmol/l |
| formate | 40 µmol/l |
| polyvinylpyrrolidone | 3 mg/l |
| hydroxyethylcellulose | 1 mg/l |
| xanthan | 1 mg/l |
| gum arabic | 1 mg/l |
| pectin | 1 mg/l |
| agar-agar | 1 mg/l |
| magnesium ions | 8 mg/l |

-continued

| | |
|---|---|
| iodide ions | 10 µg/l |
| betaine | 2 mg/l |

The advantages of the working-up agents according to the present invention are considerable. In comparison with products according to the prior art, by combination of exclusively or preponderantly naturally-occurring active substances, the following product functions are achieved individually or in combination:

reduction of chlorine and of other active chlorine substances;

complexing of toxic heavy metals and reduction of the metal toxicity;

reduction of the aggressiveness of tap water and mucous membrane protection;

cell protection, promotion of the bacteria and of the ecosystem;

supplementation of the content of magnesium and iodide ions.

Further advantages of the use of natural substances are:

easy microbial decomposability;

after fulfilment of their function, the active materials achieve short residence times in the maintenance water;

in the case of breakdown, plant-promoting materials are formed, mainly carbon dioxide;

very good compatibility for all animal and plant water organisms;

no accumulation in the case of repeated use;

can also be used between water changes; and quasi-continuous, under-dosed use produces low steady-state concentrations of the important natural active materials.

What is claimed is:

1. An agent for reducing the negative or harmful effects of to aquatic animal life of water treated and/or purified for human or animal consumption, comprising:

a) correction additives for the approximation of natural water quality; and b) a natural additive comprising tartaric acid, formate and magnesium ions.

2. An agent according to claim 1, additionally containing ethylenediamine-tetraacetate, polyvinylpyrrolidone and hydroxyethylcellulose.

3. An agent according to claim 1, wherein it is prepared as a concentrated aqueous solution.

4. An agent according to claim 1, wherein it is preparedin the form of tablets, powder mixtures, granulates, extrudates or capsules.

5. An agent according to claim 4, wherein it is confectioned as an individual dose for treatment of a definite amount of water.

* * * * *